United States Patent
Kirschner

[15] 3,638,511
[45] Feb. 1, 1972

[54] ASSEMBLY UNIT OF TOOTHED ELEMENTS FOR MOTOR VEHICLES

[72] Inventor: Peter Kirschner, Wolfsburg, Germany
[73] Assignee: Volkswagenwerk AKG, Wolfsburg, Germany
[22] Filed: Apr. 23, 1970
[21] Appl. No.: 43,298

[30] Foreign Application Priority Data

Apr. 25, 1969 Germany.....................P 19 21 099.2

[52] U.S. Cl. .............................................74/440, 64/9 R
[51] Int. Cl......................F16h 55/18, F16d 3/18, F16d 3/54
[58] Field of Search ......................................64/9 R; 74/440

[56] References Cited

UNITED STATES PATENTS

| | | | |
|---|---|---|---|
| 1,564,160 | 12/1925 | Wegert | 74/440 |
| 3,127,784 | 4/1964 | O'Neill | 74/440 |
| 3,399,549 | 9/1968 | Nagele | 74/440 X |

FOREIGN PATENTS OR APPLICATIONS

| | | | |
|---|---|---|---|
| 560,469 | 4/1944 | Great Britain | 74/440 |
| 928,578 | 6/1963 | Great Britain | 74/440 |

*Primary Examiner*—Leonard H. Gerin
*Attorney*—Watson, Cole, Grindle & Watson

[57] ABSTRACT

An assembly unit of toothed elements for motor vehicles and particularly for passenger cars having cooperating tooth elements and a spring to brace the elements counter to the operational direction of rotation.

3 Claims, 2 Drawing Figures

INVENTOR.
Peter Kirschner

ASSEMBLY UNIT OF TOOTHED ELEMENTS FOR MOTOR VEHICLES

This invention relates to an assembly unit of toothed elements which during operation are exposed to a change of contact of the flanks of the teeth thereby sometimes causing noises. Thus, in the case of motor vehicles and in the case of motors running out of true idling, a so-called banging or "rattling" during idling can occur by change of contact in serrated teeth sliding courses of drive shafts, curved tooth joints and in the case of gear matings, of the gearing mechanism.

Calculations show that in the case of standard sizes of passenger cars the factors causing a change of contact of the flanks of the teeth, are small, approximately 0.5–0.3 mkp, meter kilopond.

In accordance with the present invention, it has been made possible, without considerable expense, to effect a torque support acting counter to the direction of rotation by which the change of contact of the flanks of the teeth can be prevented.

In accordance with the invention, it is an object thereof to brace the cooperating toothing elements by means of a spring counter to the rotational direction.

Further objects of the invention will be apparent from the following description when considered in connection with the accompanying drawing in which.

Figure 1:
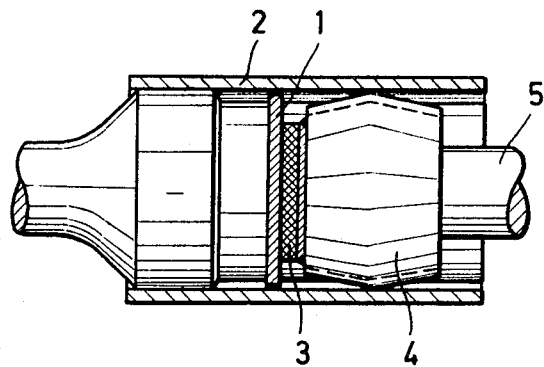
FIG. 1 is a longitudinal section of a joint partly in side elevation.

FIG. 1 shows an application of the invention in the case of a curved tooth joint which can be considered however, also for a serrated teeth sliding course. A two or more armed wing 1 of plastic or metal and which fits into the inner teeth of the sliding sleeve 2, is connected with a curved tooth head 4 by means of a spiral or rubber spring, 3. During mounting, wing 1 is inserted into the inner toothed element of the sliding sleeve 2, after which shaft 5 with its curved tooth head 4 is twisted in the rotational direction of the driving shaft until achieving the required factor.

Figure 2:
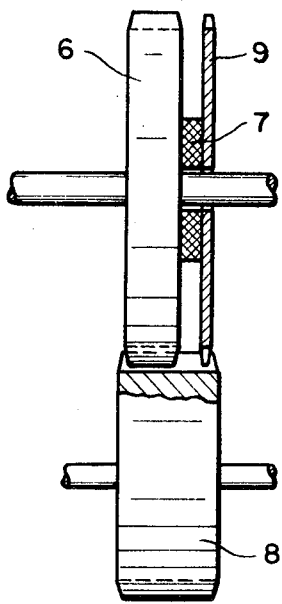
FIG. 2 is part sectional view of a torque support.

FIG. 2 illustrates the principle of the torque support according to the invention applied to a mating gear. A narrow plastic or metal gear 8 is connected with a gear 6 by means of a spiral or rubber spring 7 and is braced prior to mounting against the gear 8 in such a way that the flanks of the teeth of the two gears 9 and 6 are pressed together after assembly. At the same time it is of no consequence whether the gear 9 is attached to the driving or to the driven wheel.

I claim:

1. Antibacklash gears having a first gear and a second gear being in meshing engagement with one another and means to brace the gears counter to the operational direction of rotation, said means comprising a two or more armed symmetric lever being connected by means of a rubber spring to the front face of said first gear and being in engagement with the teeth of said second gear after an angular rotation of said lever with respect to said first gear.

2. Antibacklash gears having a curved tooth joint and a slide-sleeve having inner teeth being in meshing engagement with said curved tooth joint and means to brace said tooth joint and said slide-sleeve counter to the operational direction of rotation, said means comprising a two or more armed symmetric lever connected by means of a rubber spring to the front face of said tooth joint and being in engagement with the inner teeth of said slide-sleeve after an angular rotation of said lever with respect to said tooth joint.

3. Antibacklash gears having a first gear and a second gear being in meshing engagement with one another and means to brace the gears counter to the operational direction of rotation, which said means comprises a two or more armed symmetric lever being connected by means of a rubber spring to the front face of said first gear, said lever and said rubber spring having aligned openings and being supported through said openings on the shaft of said first gear, said lever being in engagement with said second gear after an angular rotation of said lever with respect to said first gear.

* * * * *